(12) United States Patent
Sanpei et al.

(10) Patent No.: US 6,404,591 B1
(45) Date of Patent: Jun. 11, 2002

(54) MAGNETIC HEAD HAVING CUT-OUT PORTIONS FOR DIFFERENT RECORDING DENSITY HEAD CORES

(75) Inventors: Hiroshi Sanpei; Yoichi Maki, both of Yamagata (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/848,429

(22) Filed: May 4, 2001

Related U.S. Application Data

(62) Division of application No. 08/795,849, filed on Feb. 5, 1997, now abandoned.

(30) Foreign Application Priority Data

Feb. 6, 1996 (JP) .............................................. 8-20191
Feb. 28, 1996 (JP) .............................................. 8-67306

(51) Int. Cl.[7] .......................... G11B 5/60; G11B 17/32; G11B 21/21
(52) U.S. Cl. .................................... 360/234.9; 360/235
(58) Field of Search ........................ 360/234.9, 234.8, 360/235; 29/603.04, 603.06, 603.2, 603.26

(56) References Cited

U.S. PATENT DOCUMENTS

| | | | |
|---|---|---|---|
| 4,334,252 A | 6/1982 | Toriu | |
| 4,870,521 A | * 9/1989 | Okabayashi | ................ 360/235 |
| 5,202,863 A | 4/1993 | Miyatake et al. | |
| 5,210,929 A | * 5/1993 | von Huene et al. | ...... 29/603.16 |
| 5,235,483 A | 8/1993 | Hayakawa et al. | |
| 5,260,845 A | 11/1993 | Takayama et al. | |
| 5,297,330 A | 3/1994 | Matsuzawa et al. | |
| 5,311,378 A | * 5/1994 | Williams et al. | ......... 360/234.2 |
| 5,485,435 A | 1/1996 | Matsuda et al. | |
| 5,576,913 A | 11/1996 | Kudo et al. | |
| 5,872,683 A | * 2/1999 | Horiuchi | .................. 360/234.8 |

FOREIGN PATENT DOCUMENTS

| | | | | |
|---|---|---|---|---|
| JP | 05101363 A | * | 4/1993 | ............ G11B/5/60 |
| JP | 05120824 A | * | 5/1993 | ........... G11B/21/21 |
| JP | 6-96429 | | 4/1994 | |

* cited by examiner

*Primary Examiner*—William Klimowicz
(74) *Attorney, Agent, or Firm*—Whitham, Curtis & Christofferson, PC

(57) ABSTRACT

The magnetic head 11 is structured such that a high-density recording head core 13 and a normal recording head core 14 are assembled integrally into the same slider 12. In the same side surface of the slider 12, there are formed a first cut-out portion 15 into which the high-density recording head core 13 can be inserted, and a second cut-out portion 16 into which the normal recording head core 14 can be inserted. The two cut-out portions 15 and 16 are formed in such a manner that they respectively extend in the rotational direction (A direction) of a magnetic disc. The two kinds of head cores 13 and 14 having different recording densities are respectively inserted into and the core hold portions 18 and 19 of the cut-out portions 15 and 16 opened up in the same side surface of the slider 12, and are then fixed thereto with adhesives 24 and 25. The two head cores 13 and 14 are assembled into the cut-out portions 15 and 16 from the same direction and are then fixed to the hold portions 18 and 19 in such a manner that they are arranged in parallel to each other.

4 Claims, 11 Drawing Sheets

US 6,404,591 B1

MAGNETIC HEAD HAVING CUT-OUT PORTIONS FOR DIFFERENT RECORDING DENSITY HEAD CORES

CROSS REFERENCE TO RELATED APPLICATIONS

This application is a divisional application of U.S. application Ser. No. 08/795,849, now abandoned, filed Feb. 5, 1997.

BACKGROUND OF THE INVENTION

1. Field of the Invention

The present invention relates to a magnetic head for a magnetic disc and a method for manufacturing the same and, in particular, to a magnetic head for a magnetic disc, in which a plurality of head cores having different recording densities are disposed adjacent to one another, and a method for manufacturing the same.

2. Related Art

As a conventional magnetic head for a magnetic disc, for example, there is known a magnetic head having such a structure as shown in FIGS. 9 and 10. The present conventional magnetic head includes a head core 1a, which is mounted on a head arm (not shown) of a magnetic disc device and can be slidingly contacted with the recording surface of a magnetic disc for magnetic recording and reproduction, and a head core 1A for erasing the magnetic records of a magnetic disc in order to restrict the width of a track.

In the head cores 1a and 1A, there are formed gaps $G_1$ and $G_2$ respectively. In such a manner that the head cores 1a and 1A are held by and between a wear resistant slider 2A and a wear resistant slider with a groove 3A both of which can be slidingly contacted with the recording surface of the magnetic disc, these head cores 1a and 1A are retained by a ferrite ring 4A which shields against the external magnetism.

That is, an erasing coil 5A for erasing the magnetic records of the magnetic disc is fitted into the interior portion of the erasing head core 1A, while a recording and reproducing coil 6A for recording and reproducing the recording information of the magnetic disc is fitted into the interior portion of the recording and reproducing head core 1a. Also, a back core 7A for forming a magnetic path is disposed in contact with the lower portions of the head cores 1a and 1A.

Now, in a personal computer or the like which incorporates a magnetic disc device therein, there is required a magnetic disc device which not only is capable of mounting therein a magnetic disc having a storage capacity of 1 MB or 2 MB recordable and reproducible by a magnetic head including the above-mentioned head cores 1a and 1A but also is capable of mounting therein a magnetic disc having a storage capacity of 100 MB in compliance with a request for an increase in the storage capacity. For such high-density recording magnetic disc device, it is also desired that a conventionally used magnetic disc having a storage capacity of 1 MB or 2 MB can also be used therein.

However, under the present conditions, the above-mentioned high-density recording magnetic head is manufactured as an entirely different structure from the magnetic head having a storage capacity of 1 MB or 2 MB. That is, the magnetic disc having a storage capacity of 1 MB or 2 MB and the magnetic disc having a storage capacity of 100 MB, which are not different in outer appearance, cannot be magnetically recorded or reproduced by the same magnetic head.

In view of the above, there has been proceeding the development of a magnetic head which is structured such that it has not only a normal recording head core for a storage capacity of 1 MB or 2 MB but also a high-density recording head core for a storage capacity of 100 MB. However, when the normal recording head core for a storage capacity of 1 MB or 2 MB and the high-density recording head core for a storage capacity of 100 MB are simply united together, not only the above-mentioned head cores 1a and 1A are held by and between the sliders 2A and 3A and the back core 7A is fixed to the head cores 1a and 1A, but also the high-density recording head core is mounted on the slider 2A or 3A.

In this case, although the normal head core and high-density head core can be united together, the number of parts of such structure is large, which accordingly increases the time and labor of a process for assembling the parts of the magnetic head, so that the productivity of such magnetic head cannot be enhanced.

SUMMARY OF THE INVENTION

The present invention aims at eliminating the drawbacks found in the above-mentioned conventional magnetic head.

It is an object of the invention to provide a magnetic head for a magnetic disc and a method for manufacturing the same which can enhance the productivity thereof by incorporating therein a plurality of head cores having different recording densities in an integral manner.

It is another object of the invention to provide a magnetic head for a low order floppy disc as well as a high-density floppy disc, in which coils can be wound easily.

According to the present invention, there is provided a magnetic head for a magnetic disc, characterized in that: there are formed a plurality of cut-out portions in an integrally formed slider, a plurality of head cores having different recording densities are respectively inserted into the plurality of cut-out portions, and the plurality of head cores having different recording densities are mounted in the integrally formed slider, that is, in the same slider.

Also, according to the present invention, there is provided a method for manufacturing a magnetic head for a magnetic disc, which comprises the steps of: cutting a slider block to form a plurality of cut-out portions to thereby produce an integrally formed slider; inserting and fixing a plurality of head cores having different recording densities into the plurality of cut-out portions respectively; and mounting the plurality of head cores having different recording densities into the integrally formed slider or in the same slider.

Further, according to the present invention, there is provided out of the above-mentioned plurality of cut-out portions, a first cut-out portion allowing a first head core to be inserted thereinto and a second cut-out portion allowing a second head core to be inserted thereinto are opened up in the same surface of the slider and are arranged in parallel to each other, and the plurality of head cores are mounted in the slider in such a manner that they are arranged in parallel to each other.

Still further, according to the present invention, there is provided the first cut-out portion, into which the first head core can be inserted, is formed in such a manner that it is opened up in one surface of the slider; the second cut-out portion, into which the second head core can be inserted, is opened up in the other surface of the slider on the opposite side thereof to the one surface, and the second cut-out portion is formed in such a manner that it extends on the same line as the first cut-out portion; and, the plurality of head cores are mounted in the slider in such a manner that they respectively extend on the same line.

Yet further, according to the present invention, there is provided the first cut-out portion for insertion of the first head core is formed in such a manner that it is opened up in one surface of the slider; the second cut-out portion for insertion of the second head core is opened up in the other surface of the slider on the opposite side thereof to the one surface; and, the plurality of head cores are mounted in said slider in such a manner that they alternate each other in position.

In attaining the above object, according to the invention, there is provided a magnetic head for a floppy disc, comprising: a slider; a plurality of cut-out portions respectively formed in the slider such that they extend vertically from one side surface of the slider and extend through the slider in the vertical direction thereof; a plurality of head cores having different recording densities and formed to be inserted into their respective ones of the above-mentioned cut-out portions; a plurality of coil winding grooves formed in the slider such that they extend vertically from the slider one side surface and define head core hold portions in the top and bottom portions of the slider; and, recording and reproducing coils respectively wound around their respective head cores within the coil winding grooves, wherein the coil winding grooves include, in the slider one side surface, one or more partition walls existing between the plurality of cut-out portions.

Also, in achieving the above object, according to the invention, there is provided a magnetic head for a floppy disc, in which each of the partition walls is an intersecting point portion between the plurality of coil winding grooves formed in the above-mentioned slider one side surface such that they extend obliquely at a given angle of inclination in two directions from the area of the slider existing between the plurality of cut-out portions.

In a magnetic head according to the invention, preferably, the above-mentioned inclination angle of the coil winding grooves may be set in the range of 30 degrees to 60 degrees.

The above-mentioned means or measures operate respectively in the following manner:

That is, according to the present invention, since a plurality of head cores having different recording densities can be mounted in the same slider, even if magnetic discs having different recording densities are mounted, the present magnetic head is able to perform magnetic recording and reproducing operations in correspondence to the respective recording densities. At the same time, because the slider is formed as an integral member, the number of parts of the present magnetic head can be reduced as well as the productivity of the present magnetic head can be enhanced.

Also, according to the present invention, there is provided a method for manufacturing a magnetic head for a magnetic disc in which a slider block is cut to form a plurality of cut-out portions to thereby produce an integrally formed slider, a plurality of head cores having different recording densities are inserted into and fixed to the plurality of cut-out portions respectively, and the plurality of head cores having different recording densities are mounted into the integrally formed slider or into the same slider. Due to this, the slider can be produced as an integral member, so that the number of parts of the present magnetic head can be reduced, the productivity thereof can be enhanced, and the manufacturing cost thereof can be cut down to a lower level.

Further, according to the present invention, since the plurality of head cores can be mounted in such a manner that they are arranged in parallel to each other, the respective cut-out portions can be formed from the same direction, which not only facilitates the forming process of the cut-out portions but also can increase the strength of the other surface side of the slider.

Still further, according to the present invention, because the plurality of head cores can be mounted in the slider in such a manner that they respectively extend on the same line, the head pressures of the respective head cores to be in sliding contact with the recording surface of the magnetic disc can be set at the same level.

Yet further, according to the present invention, due to the fact that the plurality of head cores can be mounted in the slider in such a manner that they alternate each other in position, the plurality of head cores can be mounted in parallel to each other at mutually spaced positions, thereby being able to prevent interference between the plurality of head cores.

According to the above-mentioned structure, since a head core for a low order floppy disc and a high density head core for a high-density floppy disc are assembled into the same slider, both of the above-mentioned floppy discs can be recorded and reproduced by the present magnetic head. Also, because the coil winding grooves each includes a partition wall between the plurality of cut-out portions of the present invention, or because the coil winding grooves extend obliquely in two directions from the area of the slider one side surface existing between the plurality of cut-out portions according to the present invention, there can be defined mutually independent coil winding grooves or coil winding grooves which are independent of each other and each of which has a triangular-shaped section.

Due to this, when winding the coils around the core half sections of the corresponding head cores respectively, there is eliminated the possibility that the coil can be entangled around the core half sections of the other head cores or with the coils to be wound around the core half sections of the other head cores, thereby being able to improve the coil winding efficiency of the magnetic head.

Also, according to the present invention, especially since the coil winding grooves do not extend in parallel to one side surface of the slider but extend in such a manner as to form a triangular shape, the amount of cutting of the slider when the coil winding grooves are formed by cutting the slider can be reduced, so that the time necessary for cutting or machining of the coil winding grooves can be shortened.

Further, in connection with the head core hold portions that are defined by the thus formed coil winding grooves of the slider, the rigidity of the slider in the thickness direction thereof is increased, thereby being able to improve the flatness of the disc sliding surface of the slider.

When the inclination angle of the coil winding grooves is set in the range of 30 degrees to 60 degrees, the spaces of the coil winding grooves, which respectively have a triangular-shaped section and are used to wind the coils, can be used effectively to thereby be able to reduce the amount of cutting of the coil winding grooves. This also makes it possible to increase the rigidity of the slider as greatly as possible.

DETAILED DESCRIPTION OF THE PREFERRED EMBODIMENTS

Next, description will be given below of the embodiments of a magnetic head for a magnetic disc and a method for manufacturing the same according to the invention with reference to the accompanying drawings.

Figure 1:
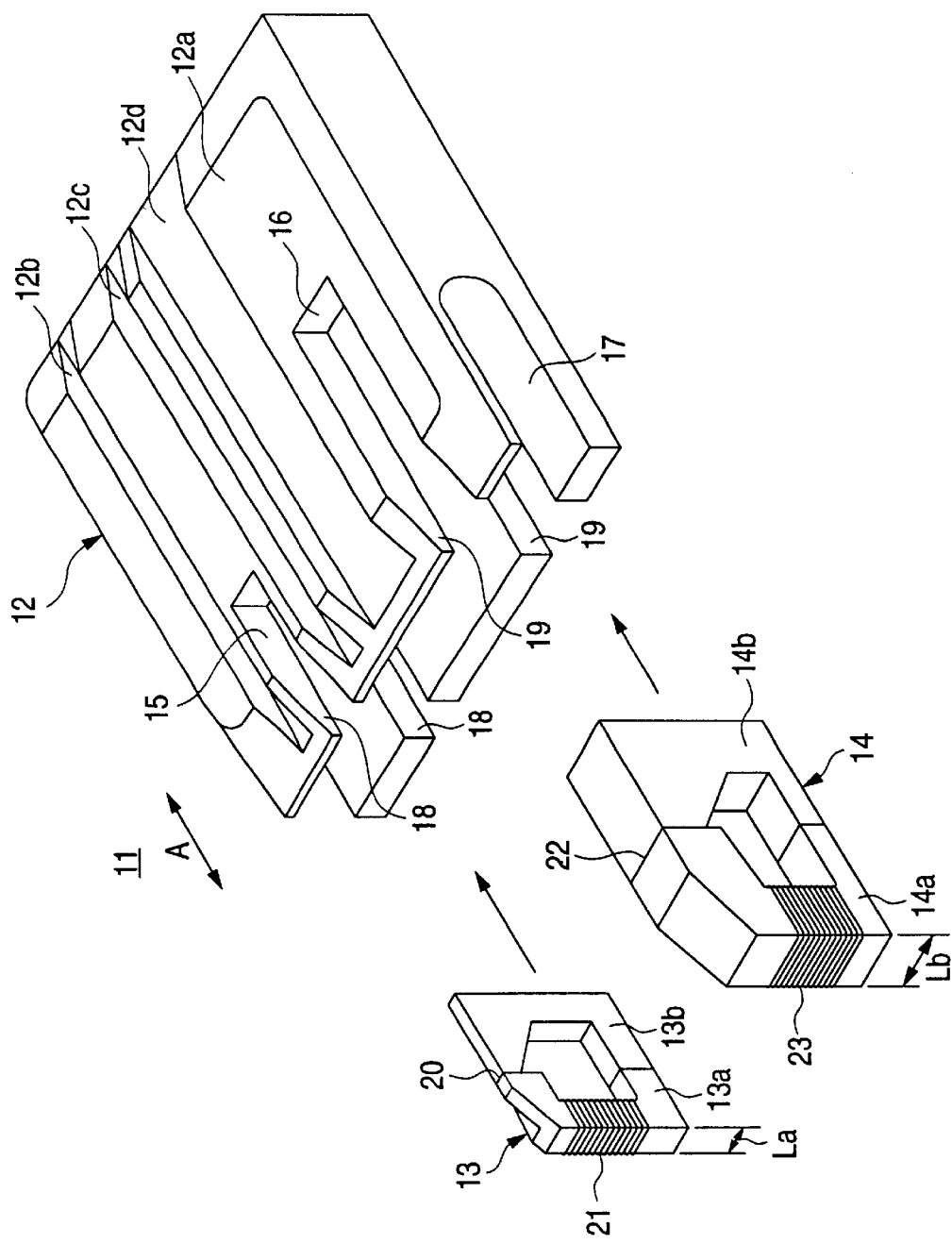
FIG. 1 is an exploded perspective view of an embodiment of a magnetic head according to the invention.

At first, FIG. 1 is an exploded perspective view of the structure of a magnetic head according to an embodiment of the invention.

The present magnetic head 11 includes a slider 12 and, in the same slider 12, there are integrally incorporated a high-density recording head core 13 for a storage capacity of 100 MB and a normal recording head core 14 for a storage capacity of 1 MB or 2 MB.

The slider 12, which is formed of ceramics, includes in the same side surface thereof a first cut-out portion 15 for insertion of the high-density recording head core 13 and a second cut-out portion 16 for insertion of the normal recording head core 14. The two cut-out portions 15 and 16 are respectively formed in such a manner that they not only extend through the slider 12 in the thickness direction (in the vertical direction) thereof but also extend in the rotational direction (A direction) of a magnetic disc (not shown). As will be described later, the thickness dimensions La and Lb (the thickness dimensions in the track width direction) of the head cores 13 and 14 are set such that La<Lb, while the cut-out portions 15 and 16 respectively have groove widths which are slightly larger than the core widths La and Lb.

Also, in the same side surface of the slider 12, there is formed a coil winding groove 17 which intersects the two cut-out portions 15 and 16. Due to the formation of the coil winding groove 17, upwardly and downwardly of the groove 17, there are formed a pair of core hold portions 18 and 18 for holding the top and bottom portions of the head core 13 as well as a pair of core hold portions 19 and 19 for holding the top and bottom portions of the head core 14.

Further, in the disc sliding surface 12a of the slider 12, in order to stabilize the pressure of the magnetic head with respect to the magnetic disc, there are formed grooves 12b–12d respectively extending in the A direction which is the rotational direction of the magnetic disc (not shown). Still further, in order to protect the recording surface of the magnetic disc against damage, the peripheral edge portions of the disc sliding surface 12a are chamfered and there are thereby formed slanting surfaces 26 on the peripheral edge portions of the disc sliding surface 12a.

The high-density recording head core 13 is formed by butting a pair of U-shaped core half sections 13a and 13b against each other into a united body, while a gap 20 is formed to in the butted portion on the upper surface side of the head core 13. Also, a coil 21 for recording and reproduction is wound around one core half section 13a of the head core 13.

Here, in the magnetic disc for a storage capacity of 100 MB, in order to achieve higher density recording, the track width thereof is set narrow. In correspondence to this, the head core 13 is structured such that the upper portion thereof including the gap 20 is formed in stages and narrow in width.

Also, the recording head core 14 is formed by butting a pair of U-shaped core half sections 14a and 14b against each other into a united body, while a gap 22 is formed in the butted portion on the upper surface side of the head core 14. Also, a coil 23 for recording and reproduction is wound around one core half section 14a of the head core 14.

Since a magnetic disc for a storage capacity of 1 MB or 2 MB is larger in the track width than a magnetic disc for high-density recording, the normal recording head core 14 is larger in the core width dimension than the above-mentioned high-density recording head core 13.

Figure 2:
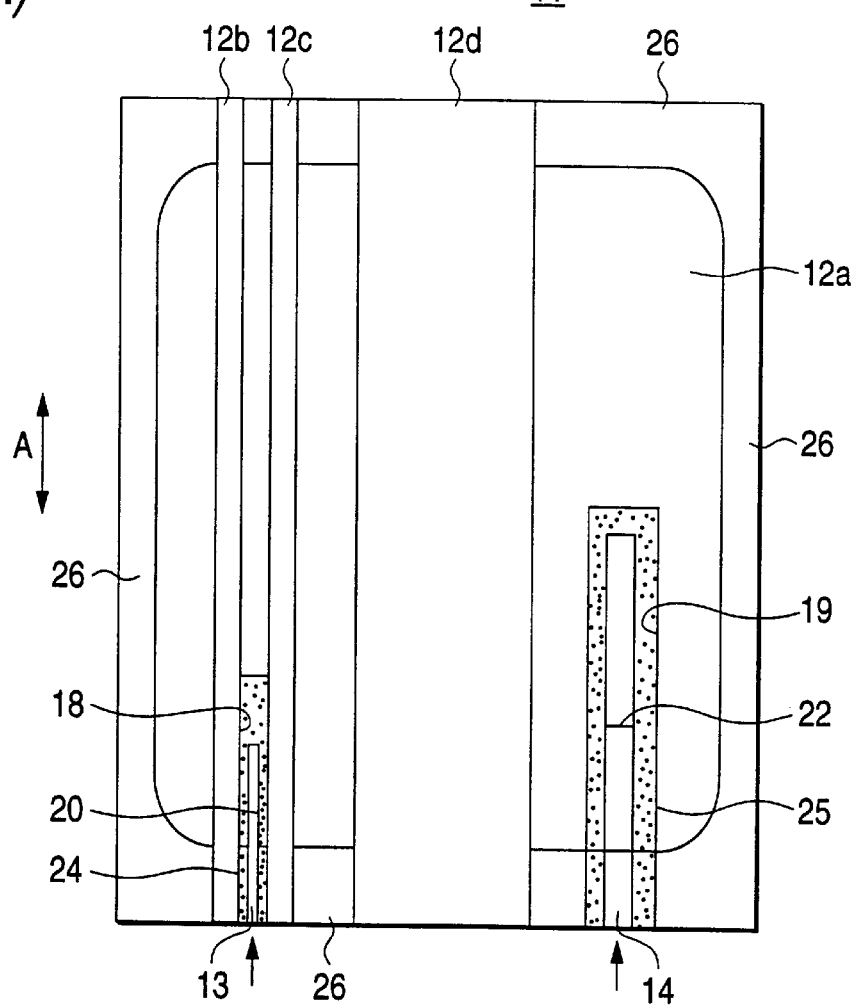
FIGS. 2(A) and 2(B) are explanatory views of a magnetic head according to the invention, showing a state thereof after the assembling thereof is completed.
Figure 2:
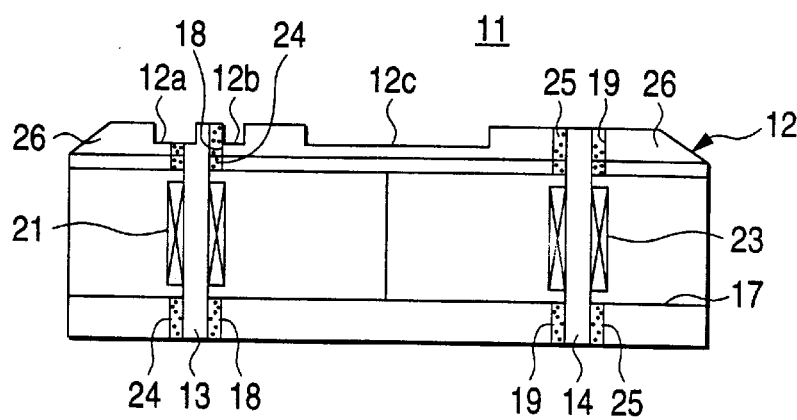

Now, FIG. 2 is a view of the magnetic head 11, showing a state thereof in which the assembling step thereof is completed.

The two head cores 13 and 14 having different recording densities are respectively inserted into the hold portions 18 and 19 of the cut-out portions 15 and 16 opened up in the same side surface of the slider 12, and are then fixed to the hold portions 18 and 19 with adhesives 24 and 25 (which are shown by flecked patterns in FIG. 2).

Because the head cores 13 and 14 are assembled from the same direction and are fixed in parallel to each other to the core hold portions 18 and 19, the assembling step thereof can be carried out easily. Further, in the present magnetic head 11, since the two head cores 13 and 14 having different recording densities are assembled integrally into the same slider 12, not only the strength of the slider 12 can be secured but also there is eliminated such time and labor for assembling a plurality of sliders as in the conventional magnetic disc to thereby be able to reduce the assembling time thereof.

Still further, in the present magnetic disc 11, since there is eliminated such need to use a back core in the normal recording head core 14 as in the conventional magnetic disc, it is possible to avoid such magnetic efficiency deterioration that can be easily caused in the contact portion of the head core with the back core, thereby being able to prevent the inductance of the head core 14 from being lowered.

Next, description will be given below of a method for manufacturing the magnetic head 11 having the above-mentioned structure. Here, FIGS. 3 to 6 are respectively views to show the manufacturing process of the magnetic head 11.

Figure 3:
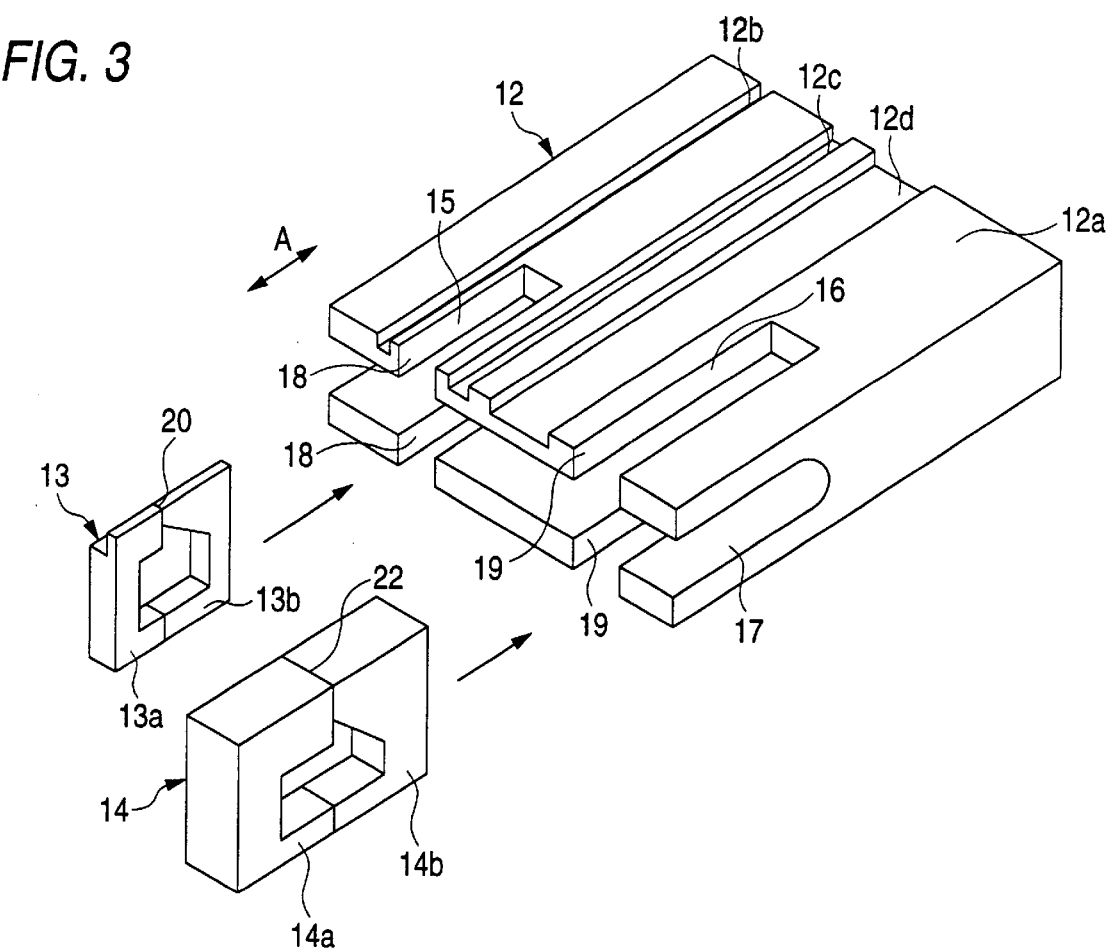
FIG. 3 is an exploded perspective view of a slider and two head cores respectively employed in the present magnetic head.

(1) First Step (see FIG. 3)

At first, a ceramics block (not shown) is cut to thereby produce a slider 12 having a given dimension. Then, one side surface of the slider 12 is cut to thereby form cut-out portions 15 and 16 and, at the same time, the same side surface is cut to thereby form a coil winding groove 17 which extends in a direction to intersect the cut-out portions 15 and 16. As a result of this, there are formed core hold portions 18 and 19 on one side surface of the slider 12.

Next, the sliding surface 12a of the slider 12 is cut to thereby form grooves 12b–12d respectively extending in an A direction which is the rotational direction of a magnetic disc (not shown). In the present embodiment, since the cut-out portions 15, 16 and coil winding groove 17 are cut from the same direction, the number of times the jig of the cutting machine is mounted and removed can be reduced to thereby shorten the time necessary to cut the cut-out portions 15, 16 and coil winding groove 17.

Also, the high-density recording head core 13 and normal recording head core 14 may be previously manufactured, or they may be manufactured at the same time when the slider 12 is cut out from the ceramics block.

Figure 4:
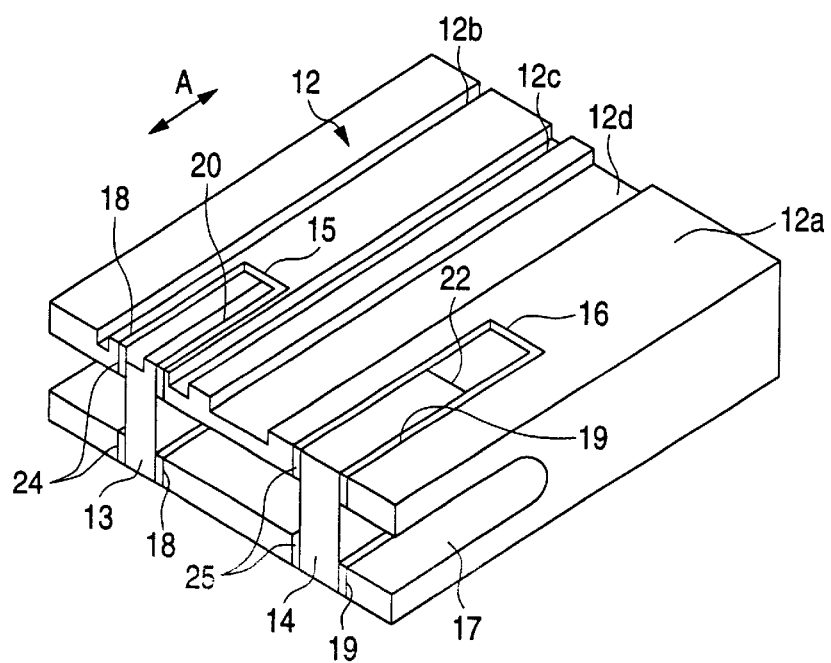
FIG. 4 is a perspective view of the slider and head cores, showing a state thereof in which the two head cores have been assembled into the slider.

(2) Second Step (see FIG. 4)

Next, the high-density recording head core 13 is inserted into the cut-out portion 15 of the slider 12, and the top and bottom portions of the head core 13 are fixed to the slider 12 with an adhesive 24. After then, the normal recording head core 14 is inserted into the cut-out portion 16 of the slider 12, and the top and bottom portions of the head core 14 are fixed to the slider 12 with an adhesive 25. As a result of this, a pair of head cores 13 and 14 are assembled into the same slider 12 in such a manner that they extend in parallel to the slider 12.

Figure 9:
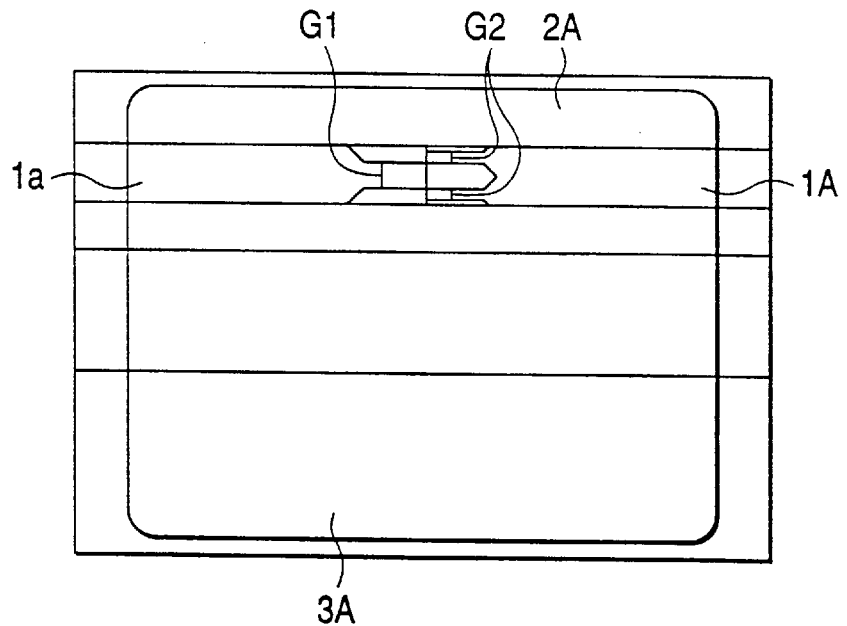
FIG. 9 is a plan view of a conventional magnetic head.
Figure 10:
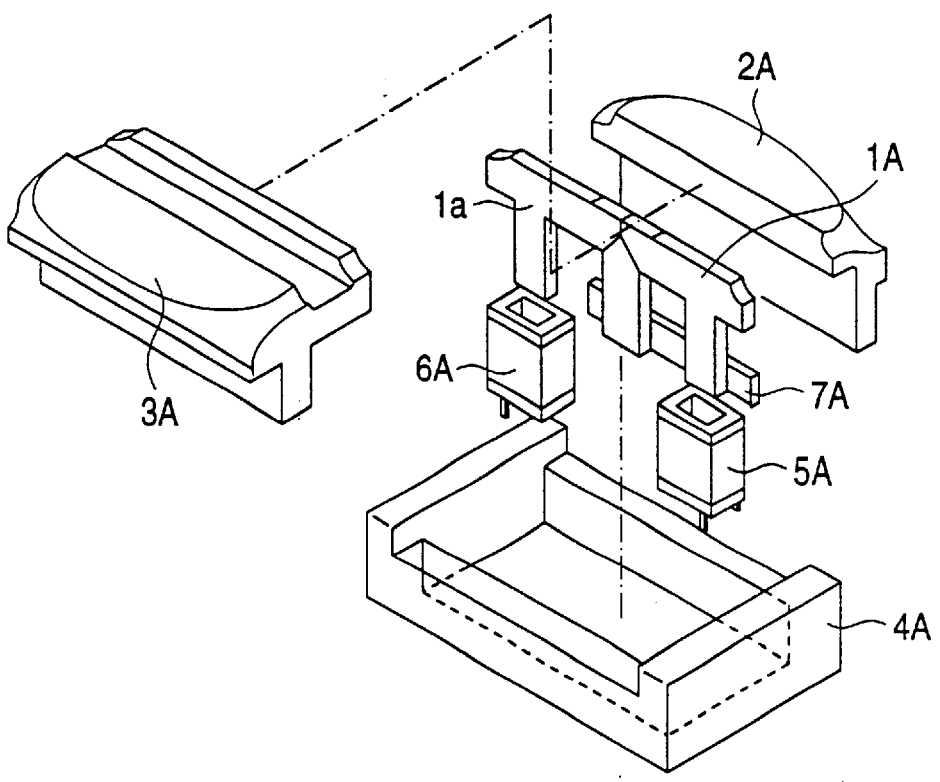
FIG. 10 is an exploded perspective view of the conventional magnetic head.

In the present embodiment, since the high-density recording head core 13 and normal recording head core 14 can be assembled or united into the same slider 12, when compared with the conventional magnetic head (see FIGS. 9 and 10), the number of parts of the present embodiment can be reduced and the assembling time thereof can be shortened, thereby being able to enhancing the productivity thereof. Also, the pair of head cores 13 and 14 can be both inserted into the slider 12 from the same direction and can be fixed to the core hold portions 18 and 19 of the slider 12 respectively. This facilitates the assembling of the head cores 13 and 14 as well as can shorten the assembling time thereof.

Figure 5:
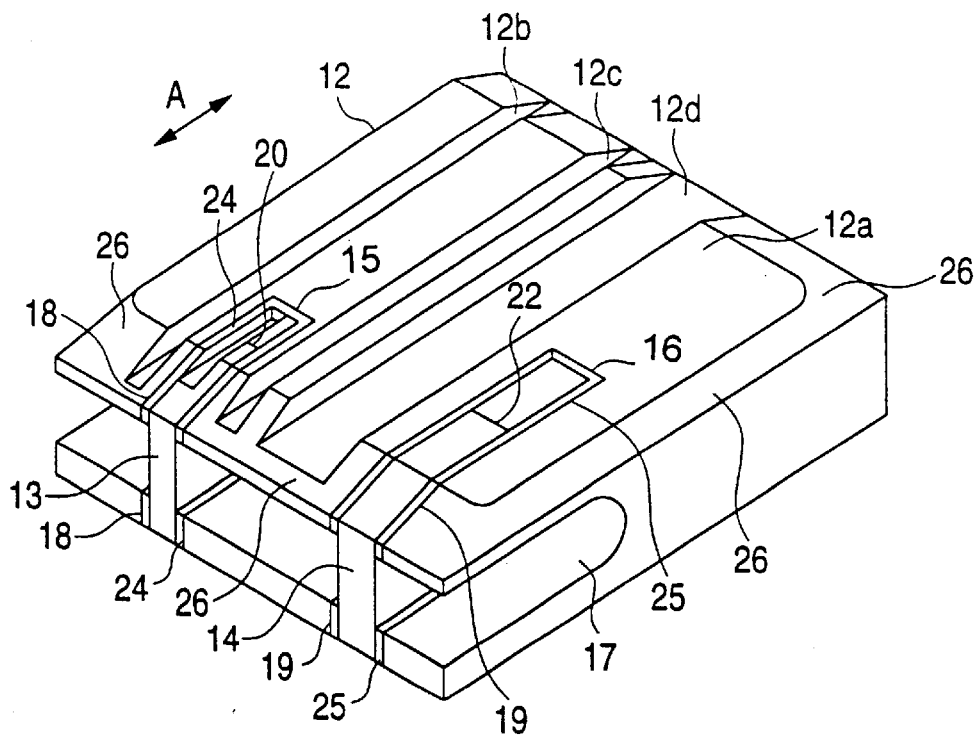
FIG. 5 is a perspective view of the slider, showing a state thereof in which the peripheral edge portions of the upper surface of the slider have been chamfered.

(3) Third Step (see FIG. 5)

After the two head cores 13 and 14 are respectively fixed to the slider 12, the peripheral edge portions of the disc sliding surface 12a of the slider 12 are chamfered. As a result of this, there are formed slanting surfaces 26 in the peripheral edge portions of the disc sliding surface 12a of the slider 12. Due to this, in the recording or reproducing operation, the magnetic head 11 can be slidingly contacted with the magnetic disc in such a manner that it cannot damage the surface of the magnetic disc.

Figure 6:
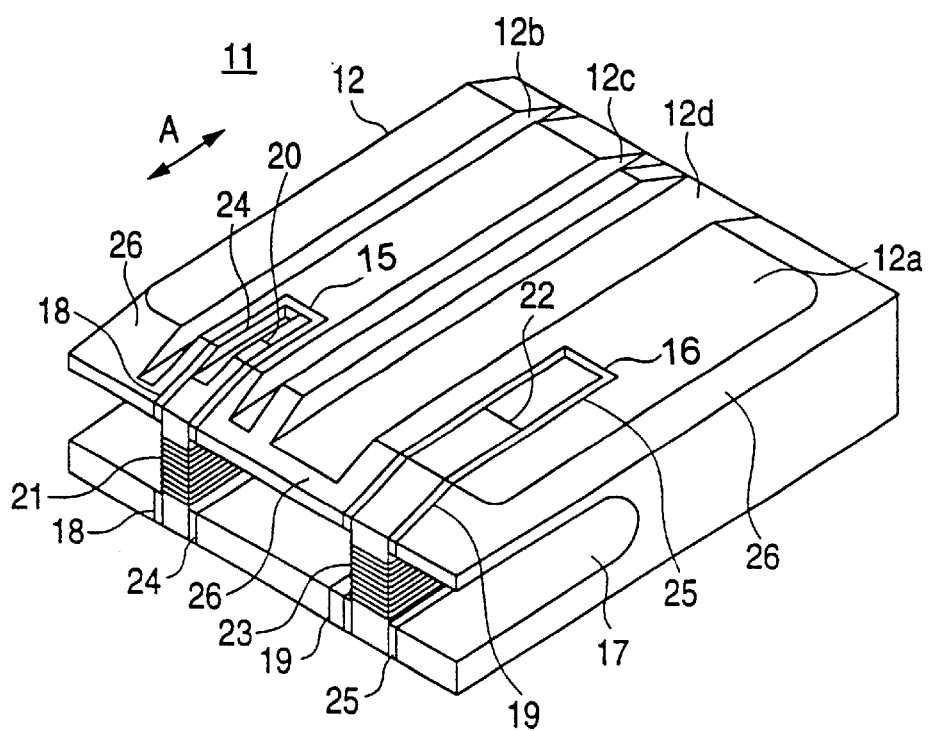
FIG. 6 is a perspective view of the present magnetic head after the assembling thereof is completed.

(4) Fourth Step (see FIG. 6)

A coil 21 is inserted into the coil winding groove 17 and the coil 21 is wound around the core half section 13a of the high-density recording head core 13. Similarly, a coil 23 is wound around the core half section 14a of the normal recording head core 14. This completes the assembling operation of the above-mentioned magnetic head 11.

Figure 7:
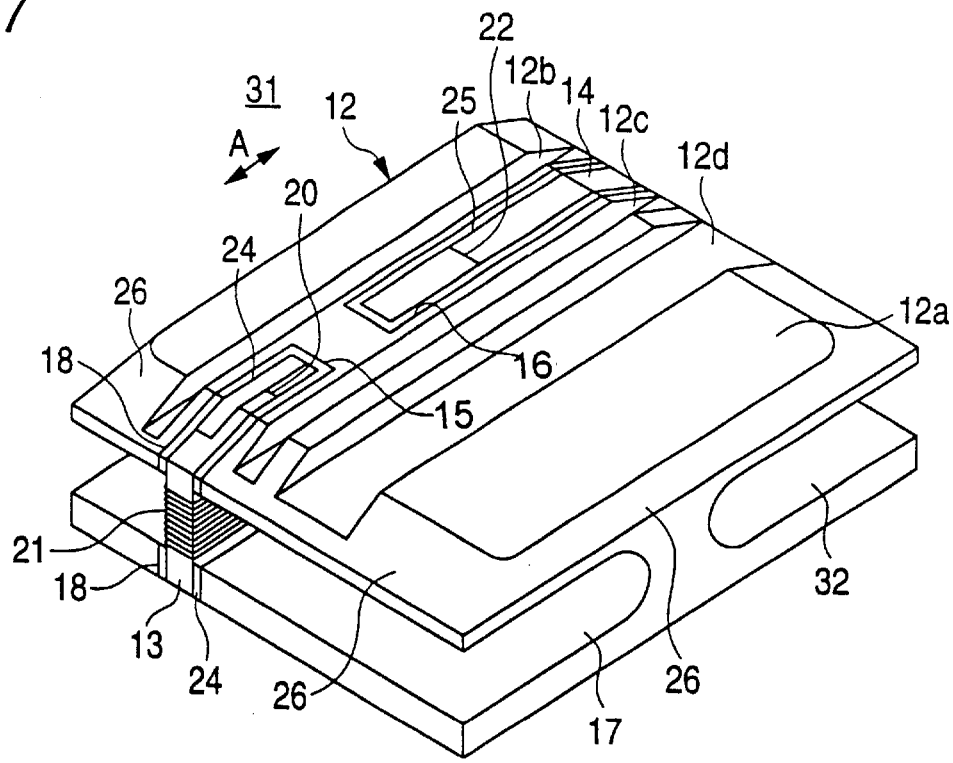
FIG. 7 is a perspective view of a modification of a magnetic head according to the invention.

Now, FIG. 7 shows a modification of a magnetic head according to the invention.

In a magnetic head 31 according to the present modification, a first cut-out portion 15 is formed in one side surface of the slider 12, while a second cut-out portion 16 is formed in the opposite side surface of the slider 12. Also, the first and second cut-out portions 15 and 16 are arranged such that they are present on the same line and extend in the rotational direction (in FIG. 7, A direction) of a magnetic disc (not shown).

Further, in one side surface of the slider 12, there is formed a coil winding groove 17 in such a manner that it extends to intersect the first cut-out portion 15 and, at the same time, on the opposite side surface of the slider, there is formed a coil winding groove 32 which extends in a direction to intersect the second cut-out portion 16.

In the present modification, the high-density recording head core 13 is inserted into the first cut-out portion 15 from one side surface of the slider 12 and is then fixed thereto, while the normal recording head core 14 is inserted into the second cut-out portion 16 from the opposite side surface of the slider 12 and is then fixed thereto. After then, a coil 21 is wound around the high-density recording head core 13 through the coil winding groove 17 and, next, a coil 23 is wound around the normal recording head core 14 through the coil winding groove 32.

In the thus structured magnetic head 31, since the high-density recording head core 13 and normal recording head core 14 are assembled into the magnetic head 31 in such a manner that they extend on the same line, not only when recording into and reproducing from a magnetic disc for a storage capacity of 100 MB but also when recording into and reproducing from a normal magnetic disc for a storage capacity of 1 MB or 2 MB, the head pressure of the head cores 13 and 14 with respect to the magnetic disc can be kept constant, so that stable magnetic recording and reproduction can be achieved by use of either of the head core 13 or head core 14.

Figure 8:
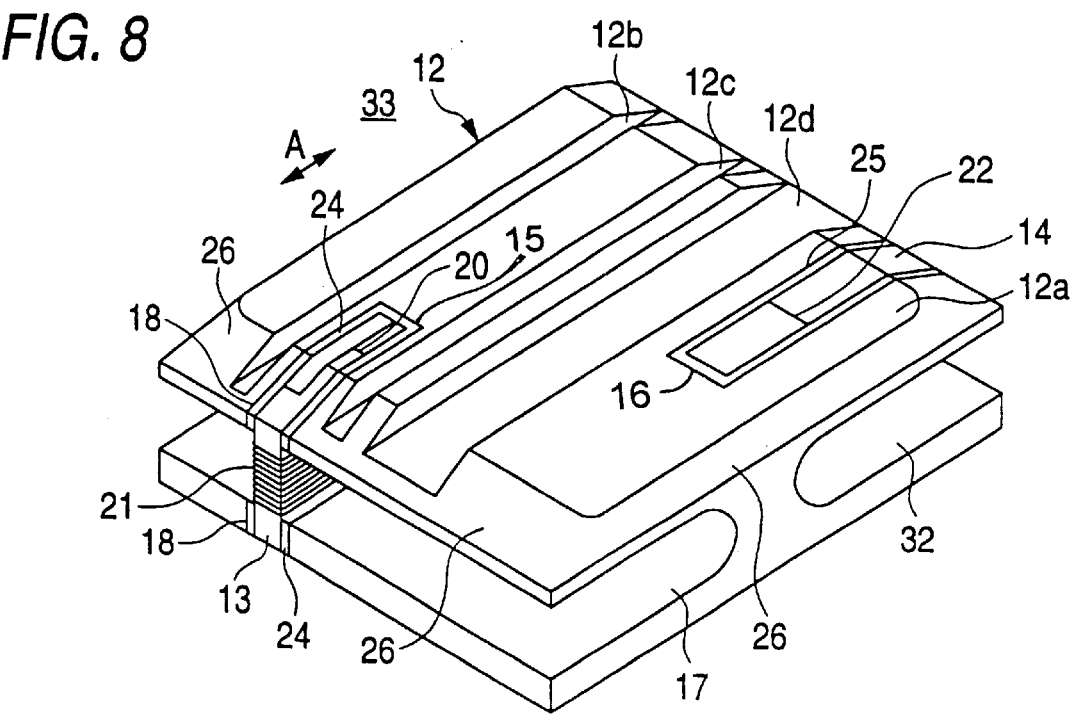
FIG. 8 is a perspective view of another modification of a magnetic head according to the invention.

Now, FIG. 8 shows another modification of a magnetic head according to the invention.

In a magnetic head 33 according to the present modification, there is formed a first cut-out portion 15 in one side surface of the slider 12, while there is formed a second cut-out portion 16 in the opposite side surface of the slider 12. Also, the two cut-out portions 15 and 16 are arranged such that they extend in the rotational direction (in FIG. 8, A direction) of a magnetic disc (not shown) while they are shifted from each other in the track width direction.

Further, in one side surface of the slider 12, there is formed a coil winding groove 17 which extends in a direction to intersect the first cut-out portion 15 and, in the opposite side surface of the slider 12, there is formed a coil winding groove 32 which extends in a direction to intersect the second cut-out portion 16.

In the present modification, the high-density recording head core 13 is inserted into and fixed to the first cut-out portion 15 from one side surface of the slider 12, while the normal recording head core 14 is inserted into and fixed to the second cut-out portion 16 from the opposite side surface of the slider 12. After then, a coil 21 is wound around the high-density recording head core 13 through the coil winding groove 17, while a coil 23 is also wound around the normal recording head core 14 through the coil winding groove 32.

In the thus structured magnetic head 33, the high-density recording head core 13 and normal recording head core 14 are assembled into the magnetic head 33 in such a manner that they are arranged alternately. That is, when viewed from above the slider 12, the high-density recording head core 13 and normal recording head core 14 are disposed at the diagonal positions of the disc sliding surface 12*a* of the slider 12. Due to this, the two head cores 13 and 14 are respectively assembled into positions which are separated most apart from each other, which not only makes it possible to secure the strength of the slider 12 but also can prevent the two head cores 13 and 14 from interfering with each other.

In the above-mentioned respective embodiments, there is taken as an example a structure in which the two kinds of head cores 13 and 14 are mounted integrally-in the same slider 12. However, the invention is not limited to this but, for example, the invention can also be applied to a structure in which three or four kinds of head cores having different recording densities are mounted integrally in the same slider 12.

Second Embodiment

FIGS. 11 to 14 respectively show a second embodiment of a magnetic head for a floppy disc according to the invention. The second embodiment is basically similar in structure to the first embodiment.

Figure 11:
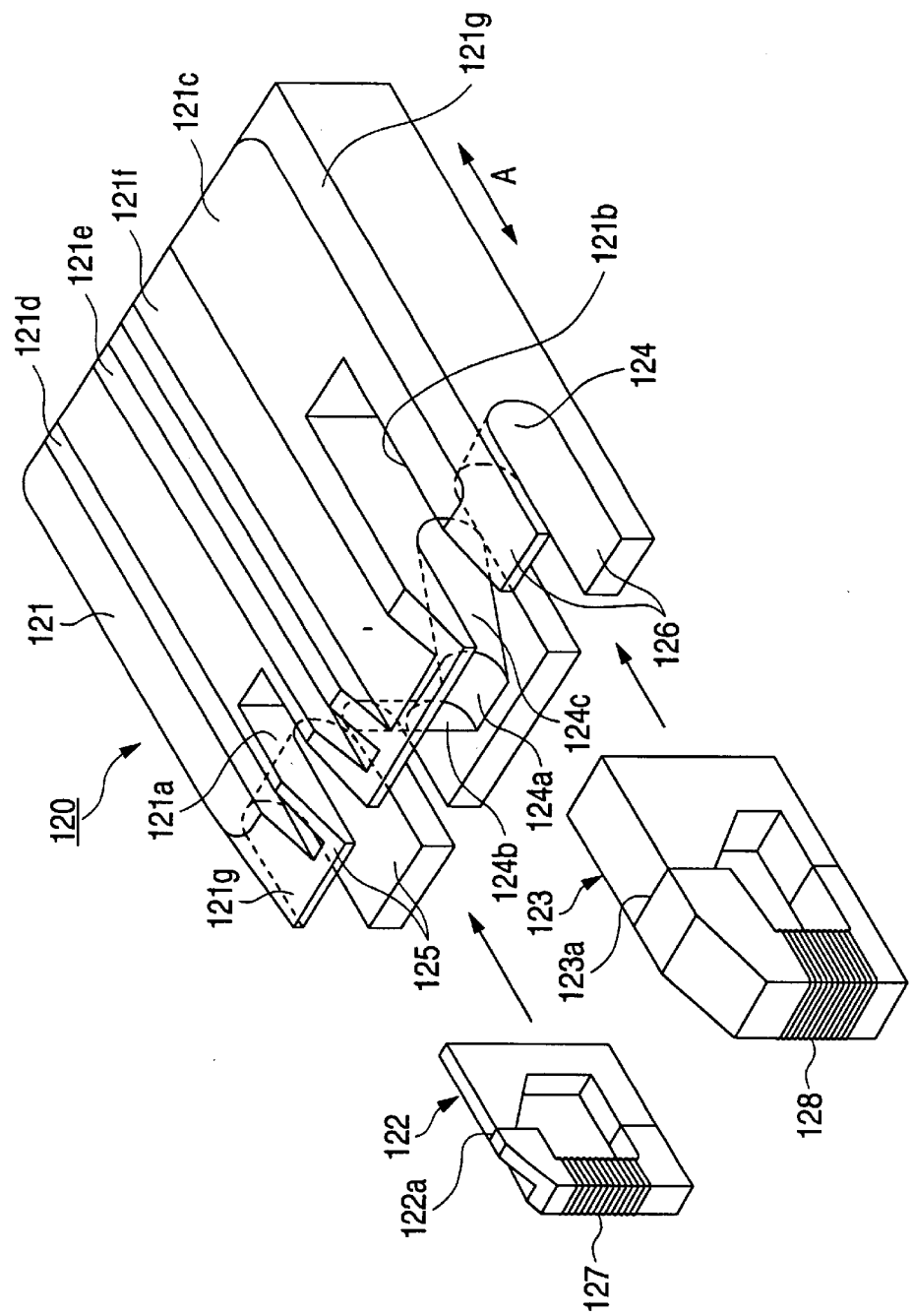
FIG. 11 is an exploded perspective view of a second embodiment of a magnetic head for a floppy disc according to the invention.
Figure 14:
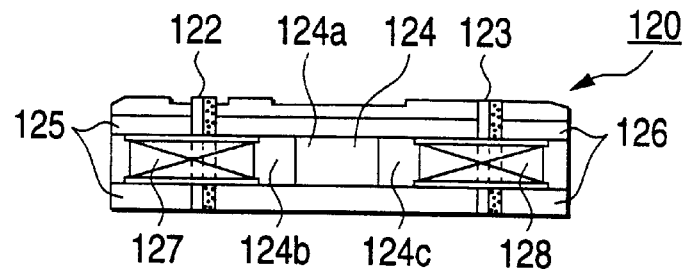
FIG. 14 is a front view of the magnetic head shown in FIG. 11, showing a state thereof in which it is assembled.

In FIGS. 11 and 14, a magnetic head 120 includes a flat slider 121, a high-density recording head core 122 with a gap 122*a* which is incorporated in the slider 121 and is so arranged as to correspond to a storage capacity of 100 MB, and a normal recording head core 123 having gap 123*a* which is also incorporated in the slider 121 and is so arranged as to correspond to a storage capacity of 1 MB or 2 MB.

The slider 121, which is formed of ceramics or the like, includes a flat surface serving as a disc sliding surface as well as includes in the same side surface thereof a first cut-out portion 121*a* into which the above-mentioned high-density recording head core 122 can be inserted, and a second cut-out portion 121*b* into which the normal recording head core 123 can be inserted. The two cut-out portions 121*a* and 121*b* respectively formed in such a manner that they extend through the slider 121 in the thickness direction (in the vertical direction) thereof and also extend in the rotational direction A of a floppy disc (not shown).

In the present embodiment, the thickness dimension (the thickness in the track width direction) of the high-density recording head core 122 is set smaller than the thickness dimension of the normal recording head core 123, while the cut-out portions 121*a* and 121*b* are respectively formed such that the groove widths thereof are slightly larger than the thickness dimensions of the head cores 122 and 123.

Also, in the same side surface of the slider 121, there is formed a coil winding groove 124 which extends in a direction to intersect the cut-out portions 121*a* and 121*b*. As a result of this, upwardly and downwardly of the coil winding groove 124, there are formed a pair of core hold portions 125 which are used to support the top and bottom portions of the high-density recording head core 122, and a pair of core hold portions 126 which arc used to support the top and bottom portions of the normal recording head core 123.

Figure 12:
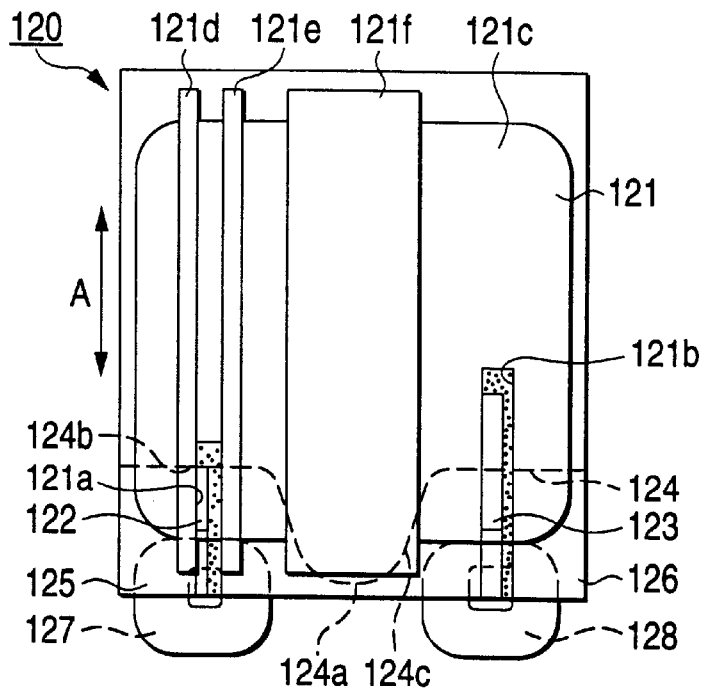
FIG. 12 is a plan view of the magnetic head shown in FIG. 11, showing a state thereof in which it is assembled.
Figure 13:
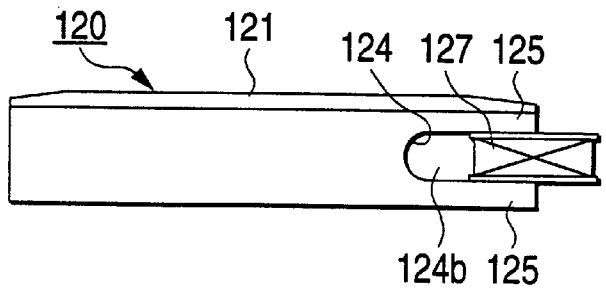
FIG. 13 a left-hand side view of the magnetic head shown in FIG. 11, showing a state thereof in which it is assembled.

Here, the coil winding groove 124, as shown in FIGS. 11 and 12, includes a partition wall 124*a* which is interposed between the two cut-out portions 121*a* and 121*b*. Due to this, on the cut out portion 121*a* side, a space for winding a coil 127 for the high-density recording head core 122 is defined by a coil winding groove 124*b* and, on the cut out portion 121*b* side, a space for winding a coil 128 for the normal recording head core 123 is defined by a coil winding groove 124*c*.

Also, in the disc sliding surface 121*c* of the slider 121, there are formed a plurality of (in the illustrated embodiment, three) grooves 121*d*, 121*e* and 121*f* which are respectively used to stabilize the head pressure of the magnetic head with respect to a floppy disc. Further, the peripheral edge portions of the disc sliding surface 121*c* are chamfered in order to protect the recording surface of the floppy disc against damage, with the result that there are formed slanting surfaces 121*g* on the peripheral edge portions of the disc sliding surface 121*c* of the slider 121.

The high-density recording head core 122 is formed by butting a pair of U-shaped core half sections against each other to combine them into a united body, while there is formed a gap 122*a* in the butted portion on the upper surface side of the head core 122. And, around the one core half section, there is wound the coil 127 which is used to record and reproduce a high-density floppy disc.

Since the magnetic head 120 for a floppy disc according to the second embodiment of the invention is structured in the above-mentioned manner, the normal recording head core 123 operates as a recording and reproducing head for a low order recording floppy disc, while the high-density recording head core 122 operates as a recording and reproducing head for a high-density recording floppy disc.

Figure 17:
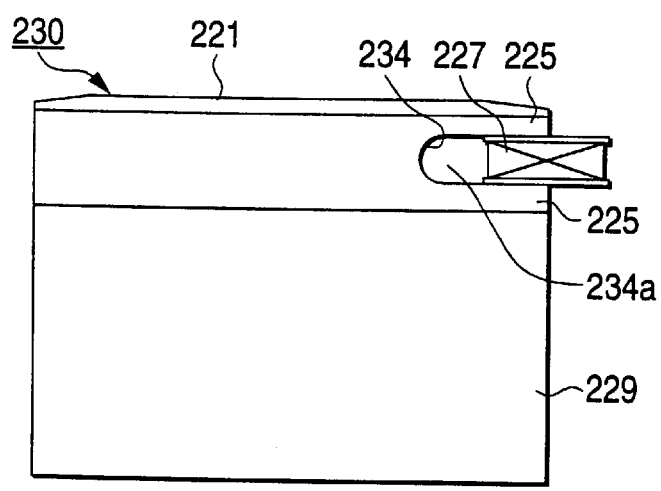
FIG. 17 is a left-hand side view of the magnetic head shown in FIG. 15, showing a state thereof in which it is assembled.
Figure 18:
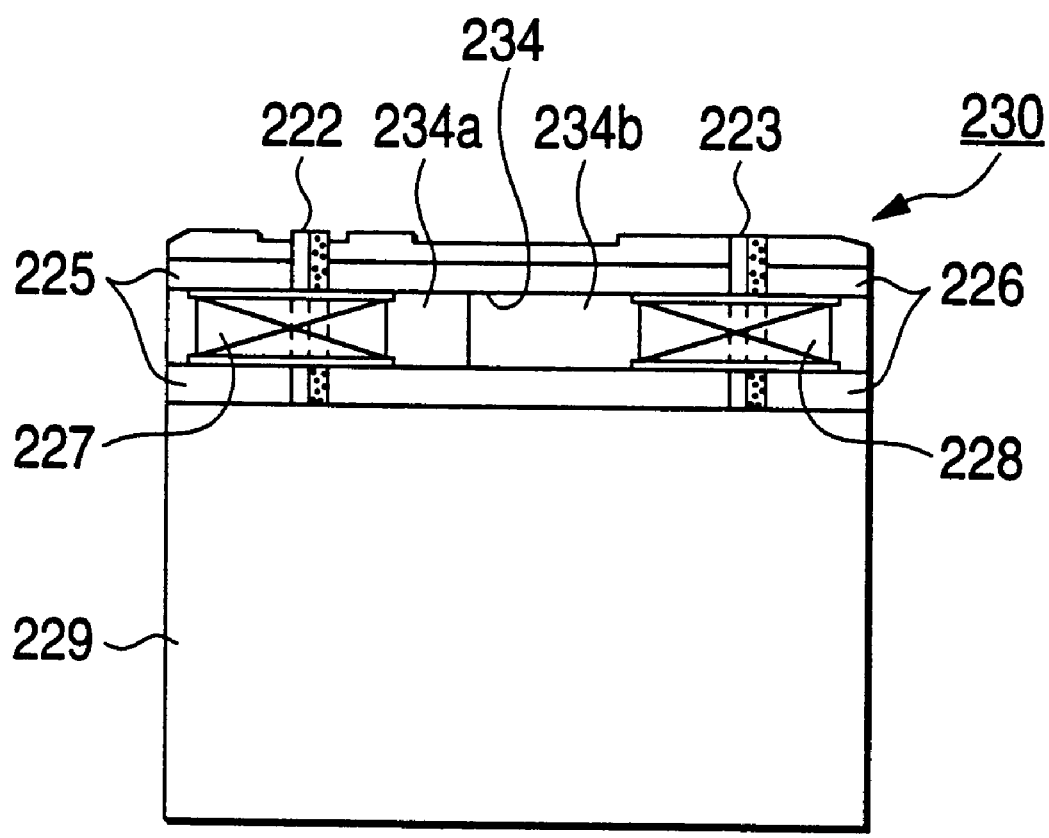
FIG. 18 is a front view of the magnetic head shown in FIG. 15, showing a state thereof in which it is assembled.

Here, in assembling, at first, the two head cores 122 and 123 are respectively inserted into the cut-out portions 121*a* and 121*b* of the slider 121, while the top and bottom portions of the head cores 122 and 123 are then respectively fixed to the core hold portions 125 and 126 with adhesives. From this state, the slider 121 is chamfered in the peripheral edge portions thereof to—thereby form the slanting surfaces 121*g*; and, further, a coil is inserted through the coil winding groove 124, so that the coil 127 is wound around the one core half section of the high-density recording head core 122, while the coil 128 is wound around the one core half section of the normal recording head core 123. After then, a ferrite ring 229 (see FIGS. 17 and 18) is mounted on the bottom surface of the slider 121, which completes the assembling of the present magnetic head 120.

In this case, the winding operations of the respective coils 127 and 128 are performed within the spaces that are respectively defined by the coil winding grooves 124*a* and 124*b*. That is, the respective coil winding grooves 124*a* and 124*b* are independent of each other. This eliminates the possibility that, when one of the coils 127 and 128 is being wound, a coil to be inserted into the coil winding groove 124 can be entangled around the other coil 128 or 127 and its associated core half section of the head core 123 or 122. This makes it possible to enhance efficiency in the operations to wind the respective coils 127 and 128.

Third Embodiment

Now, FIGS. 15 to 18 show a third embodiment of a magnetic head for a floppy disc according to the invention. The third embodiment is basically similar in structure to the first embodiment and thus description will be given below in detail of only the portions thereof that are different from the first embodiment.

Figure 15:
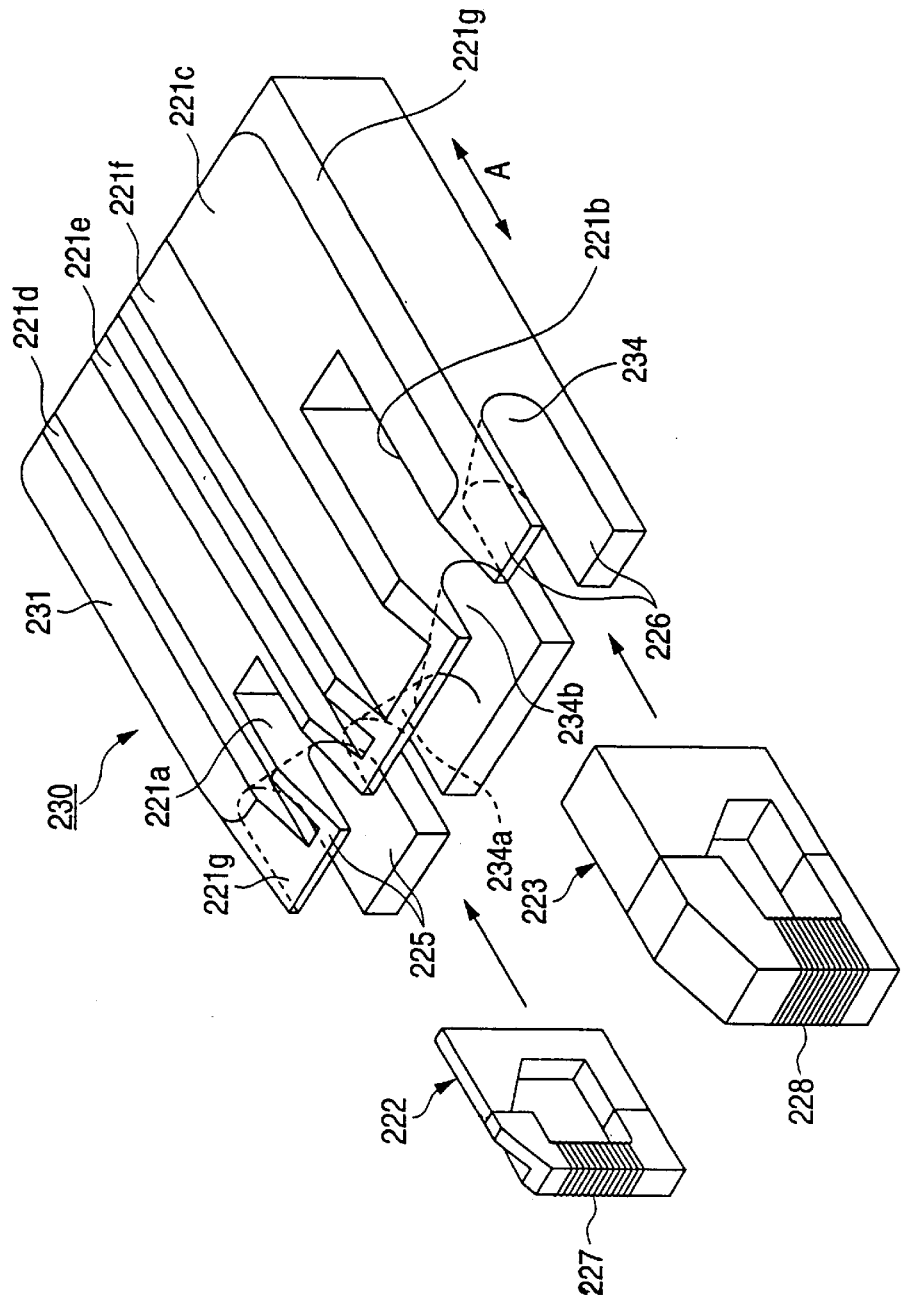
FIG. 15 is an exploded perspective view of a third embodiment of a magnetic head for a floppy disc according to the invention.
Figure 16:
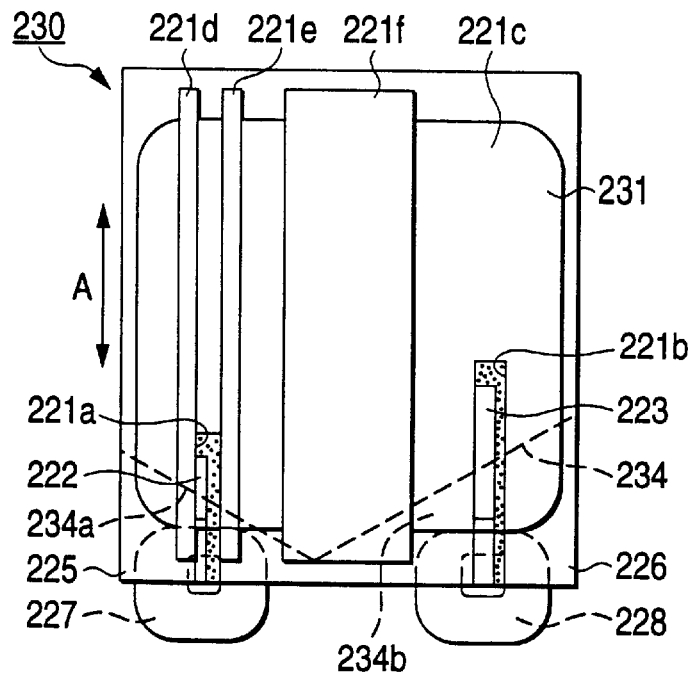
FIG. 16 is a plan view of the magnetic head shown in FIG. 15, showing a state thereof in which it is assembled.

In FIGS. 15 to 18, a coil winding groove 234, which extends in a direction to intersect two cut-out portions 221*a* and 221*b* respectively formed in the same side surface of a slider 231 provided in a magnetic head 230, as shown in FIGS. 15 and 16, is formed such that it extends obliquely at a given In FIGS. 15 to 18, a coil winding groove 234, which extends in a direction to intersect two cut-out portions 221a and 221b respectively formed in the same side surface of a slider 231 provided in a magnetic head 230, as shown in FIGS. 15 and 16, is formed such that it extends obliquely at a given angle of inclination from the area of the slider 231 existing between the two cut-out portions 221a and 221b in two directions with respect to the side surface of the slider 231 in which the two cut-out portions 221a and 221b are formed. Features 221c–g of slider surface 221 correspond to features 121c–g of FIG. 11.

That is, an intersecting portion between the coil winding grooves 234a and 234b of the coil winding groove 234 operates substantially as a partition wall. In particular, on the cut-out portion 22a side between coil hold operations 225, a space used to wind a coil 227 around a high-density recording head core 222 is defined by the coil winding groove 234a, and on the cut-out portion 221b side between coil hold operations 226, a space used to wind a coil 228 around a normal recording head core 223 is defined by the coil winding groove 234b.

In this case, the operations to wind the respective coils 227 and 228 are carried out within the spaces respectively defined by the coil winding grooves 234a and 234b of the coil winding groove 234. That is, the two spaces respectively defined by the two coil winding grooves 234a and 234b are independent of each other. This eliminates the possibility that, when one of the coils 227 and 228 is being wound, the present coil to be inserted into the coil winding groove 224 can be entangled around the other coil 228 or 227 and its associated core half section of the head core 223 or 222. This makes it possible to enhance efficiency in the operations to wind the respective coils 227 and 228.

Especially, in the present embodiment, since the coil winding grooves are respectively formed such that they extend obliquely at a given angle of inclination, the coils 227 and 228 can be wound in such a manner that the respective leading ends of the two coils 227 and 228 are guided along the present inclination angle, which can improve the coil winding operation efficiency further.

Also, when the inclination angle of the coil winding grooves is set in the range of 30 degrees to 60 degrees, spaces each having a triangular section, which are provided by the coil winding grooves and are used to perform the coil winding operations, can be used effectively, which in turn makes it possible to reduce the amount of cutting of the coil winding groove as much as possible, so that the rigidity of the slider can be increased as greatly as possible.

As has been described heretofore, according to the invention, the following various effects can be realized.

That is, according to the present invention, since a plurality of head cores having different recording densities can be mounted in the same slider, even when there are mounted magnetic discs having different recording densities, magnetic recording and reproduction can be carried out properly in correspondence to the respective recording densities; and, because the slider is formed as an integral member, the number of parts of the present magnetic head can be reduced over the conventional magnetic head. Due to this, the number of man-hour for assembling the magnetic head is reduced, which in turn makes it possible to assemble the magnetic head in a shorter time, enhance the productivity of the magnetic head, and reduce the manufacturing cost thereof. Also, unlike the conventional magnetic head in which divided sliders are connected together, according to the present invention, a plurality of head cores can be mounted in the integrally formed slider, so that the strength of the slider itself can be secured.

Also, according to the present invention, a slider block is cut to form a plurality of cut-out portions to thereby produce an integrally formed slider, and, next, a plurality of head cores having different recording densities are respectively inserted into and fixed to the above-mentioned plurality of cut-out portions, so that the plurality of head cores having the different recording densities are mounted in the above-mentioned same slider. Due to this, the slider can be produced as an integral member, which makes it possible to reduce the number of parts of the magnetic head, shorten the assembling time of the magnetic head to thereby enhance the productivity thereof, and cut down the manufacturing cost of the magnetic head to a lower level.

Further, according to the present invention, since a plurality of head cores can be mounted in such a manner that they are arranged in parallel to each other, the respective cut-out portions can be formed from the same direction, which facilitates the cutting process of the cut-out portions as well as can enhance the strength of the other surface side of the slider. Also, because the respective head cores can be assembled into the slider from the same direction, the operation time of the head core assembling process can be reduced to thereby be able to enhance the productivity of the magnetic head.

Still further, according to the present invention, since a plurality of head cores can be mounted in such a manner that they respectively extend on the same line, the head pressures of the respective head cores to be in sliding contact with the recording surface of the magnetic disc can be set at the same level. Due to this, whichever of the plurality of head cores is used for magnetic recording, the present head core can be slidingly contacted with the magnetic disc in a stable manner.

Yet further, according to the present invention, because a plurality of head cores can be mounted at alternate positions, the plurality of head cores can be mounted in such a manner that they are spaced apart from each other and arranged in parallel to each other, thereby being able to prevent interference between the plurality of head cores. Also, if a plurality of cut-out portions formed in the slider are spaced apart from each other, then the strength of the slider can be secured.

As has been described heretofore, according to the invention, since each of the coil winding grooves includes a partition wall formed between a plurality of cut-out portions or it extends obliquely in two directions from the area of the slider existing between a plurality of cut-out portions formed in the slider, for the head cores which are respectively inserted into the cut-out portions, there are defined the coil winding grooves which are independent of each other, or which are independent of each other and respectively have triangular-shaped sections. Due to this, when one coil is wound around the core half section of one of the head cores, there is eliminated the possibility that the coil can be twisted around the core half section of the other head core or with the other coil to be wound around the core half section of the other head core, thereby being able to improve the coil winding efficiency of the present magnetic head.

Also, when the coil winding grooves do not extend in parallel to one side surface of the slider but extend in such a manner as to form a triangle, the amount of cutting of the slider, when the coil winding grooves are formed by cutting the slider, can be reduced, so that the time necessary to cut or form the coil winding grooves can be shortened.

Further, in connection with the core hold portions that are defined by the thus formed coil winding grooves of the slider, the rigidity of the slider in the thickness direction thereof is enhanced, so that the flatness of the disc sliding surface of the slider can be improved.

In this manner, according to the invention, it is possible to provide a magnetic head for a low order floppy disc and a high-density floppy disc, which permits the easy winding of coils.

What is claimed is:

1. A magnetic head for a magnetic disc, comprising:
   a single integrally formed slider, including:
      a plurality of cut-out portions, extending vertically from a top portion to a bottom portion of the slider, and being in a first face of the slider so as to be arranged parallel to each other; and
      a plurality of grooves, opened in the first face and extending horizontally from opposing side portions of the slider so as to pass through the respective cut-out portions;
   a plurality of head cores, each having a gap different in recording densities and a coil wound therearound, the head cores being respectively positioned in ones of the cut-out portions;
   a partition wall formed between the horizontal grooves.

2. The magnetic head as set forth in claim 1, wherein:
   the horizontal grooves extend from the respective side portions of the slider obliquely toward the first face so as to meet with each other at a region between the cut-out portions; and
   an intersecting point of the horizontal grooves serves as the partition wall.

3. The magnetic head as set forth in claim 2, wherein each oblique angle of the horizontal grooves is set within a range of 30 to 60 degrees.

4. A method of manufacturing a magnetic head for a magnetic disc, comprising the steps of:
   providing a single integrally formed slider;
   forming a plurality of cut-out portions, extending vertically from a top portion to a bottom portion of the slider, and being in a first face of the slider so as to be arranged parallel to each other;
   forming a plurality of grooves, opened in the first face and extending horizontally from opposing side portions of the slider so as to pass through the respective cut-out portions, while forming a partition wall therebetween;
   inserting a plurality of head cores, each having a gap different in recording densities, into the respective cut out portions; and
   winding a coil around each head core using a space defined by the horizontal grooves and the partition wall therebetween.

* * * * *